(12) United States Patent
Maebashi et al.

(10) Patent No.: US 7,023,176 B2
(45) Date of Patent: Apr. 4, 2006

(54) TRANSFORMERLESS CHARGER WITH TERMINAL SAFETY FEATURES

(75) Inventors: Hiroshi Maebashi, Tokyo (JP); Kenji Nagai, Tokyo (JP); Satoru Yamamoto, Tokyo (JP)

(73) Assignee: Uniden Corporation, Tokyo (JP)

( * ) Notice: Subject to any disclaimer, the term of this patent is extended or adjusted under 35 U.S.C. 154(b) by 79 days.

(21) Appl. No.: 10/465,788

(22) Filed: Jun. 20, 2003

(65) Prior Publication Data

US 2004/0257032 A1    Dec. 23, 2004

(51) Int. Cl.
  *H01M 10/46*    (2006.01)
(52) U.S. Cl. ....................................... 320/107
(58) Field of Classification Search ............... 320/125, 320/107, 112, 113, 114
  See application file for complete search history.

(56) References Cited

U.S. PATENT DOCUMENTS 5,229,703 A * 7/1993 Harris ........................ 320/107
5,955,868 A * 9/1999 Kaite et al. ................. 320/119
6,507,168 B1 * 1/2003 Matsuda et al. ............ 320/103

* cited by examiner

*Primary Examiner*—Edward H. Tso
(74) *Attorney, Agent, or Firm*—Morgan Lewis & Bockius LLP

(57) ABSTRACT

It is an object of the present invention to provide a transformerless charger capable of preventing a human body from receiving an electric shock from a charging terminal, and of making it easy to clean the charging terminal. In order to achieve this object, the transformerless charger of the present invention comprises: a charging terminal for supplying charging voltage to rechargeable electronic equipment; a transformerless power supply circuit for supplying charging voltage to the charging terminal; a flip cover that covers the charging terminal to prevent the charging terminal from being exposed; and a switch that allows or blocks the passage of a current between the charging terminal and the transformerless power supply circuit in synchronization with an opening or closing motion of the flip cover. This configuration makes it possible to control the passage or blocking of a current at the charging terminal in response to the open or closed state of the flip cover, and therefore, it is possible to secure safety to prevent a human body from receiving an electric shock via the charging terminal and it is also possible to easily clean the charging terminal.

5 Claims, 3 Drawing Sheets

TRANSFORMERLESS CHARGER WITH TERMINAL SAFETY FEATURES

BACKGROUND

1. Field of the Invention

The present invention relates to a transformerless charger for charging a secondary battery placed in rechargeable electronic equipment such as a cordless phone or a mobile phone.

2. Description of the Related Art

Conventional chargers for charging secondary batteries placed within various kinds of electronic equipment for home appliances, such as cordless phones are constructed in order to facilitate charging operations, in such a manner that the relevant rechargeable electronic equipment can be charged simply by mounting the rechargeable electronic equipment on a mounting table on which a charging terminal is provided. If this kind of charger is provided with a transformer power supply circuit that prevents a human body from receiving an electric shock from the charging terminal, this may cause an increase in cost and weight. Moreover, since the transformer which requires a relatively large volume has to be incorporated into the charger, such construction causes the inconvenience of a charger which is designed to have limited usability.

In order to solve the aforementioned problem, a transformerless charger into which the transformer power supply circuit is incorporated has been suggested, which has made it possible to enhance the usability in designing the charger. However, since the charging terminal of the transformerless charger is continuously energized, it is necessary to prevent a human body from directly touching the charging terminal in order to secure safety.

However, if an area around the charging terminal is covered with some protective covering member, it is effective for the prevention of electric shocks, but it makes it difficult to clean the charging terminal. Particularly, in an environment containing a lot of dust or moisture, exogenous materials which make contact with the charging terminal cause chemical reactions, thereby bringing about a problem of shortening the life of the charging terminal.

SUMMARY OF THE INVENTION

Accordingly, it is an object of the present invention to provide a transformerless charger for preventing a human body from receiving an electric shock from a charging terminal and for making it easy to clean the charging terminal.

In order to achieve the aforementioned object, the transformerless charger of the present invention comprises a charging terminal for supplying charging voltage to rechargeable electronic equipment, a transformerless power supply circuit for supplying charging voltage to the charging terminal, a flip cover that covers the charging terminal to prevent the charging terminal from being exposed, and a switch that allows or blocks the passage of a current between the charging terminal and the transformerless power supply circuit in synchronization with an opening or closing motion of the flip cover.

Since this configuration enables the control to allow or block the passage of a current to the charging terminal in response to the open or closed state of the flip cover, it is possible to secure safety by preventing a human body from receiving an electric shock via a charging terminal, and to easily clean the charging terminal.

The switch allows the passage of a current between the charging terminal and the transformerless power supply circuit when the flip cover is closed, and the switch blocks the passage of a current between the charging terminal and the transformerless power supply circuit when the flip cover is opened. Accordingly, when the flip cover is opened, the charging terminal is not energized, and therefore, it is possible to clean the charging terminal safely. When the flip cover is closed, the charging terminal is covered with the flip cover, and therefore, it is possible to prevent a human body from receiving an electric shock.

Preferably, this flip cover is attached to a charger body via a hinge mechanism. Accordingly, it is possible to prevent the flip cover going missing.

The transformerless charger according to another embodiment comprises a charging terminal for supplying charging voltage to rechargeable electronic equipment, a transformerless power supply circuit for supplying charging voltage to the charging terminal, a charging terminal cover that is attachable to and detachable from the charger body so that the charging terminal is prevented from being exposed at the surface of the transformerless charger, and a switch that allows or blocks the passage of a current between the charging terminal and the transformerless power supply circuit in response to an attached or detached state of the charging terminal cover.

Since the passage or blocking of a current to the charging terminal is controlled in response to an attached or detached state of the charging terminal cover, it is possible to secure safety by preventing a human body from receiving an electric shock via the charging terminal and to easily clean the charging terminal.

This switch allows the passage of a current between the charging terminal and the transformerless power supply when the charging terminal cover is attached to the charger body, and the switch blocks the passage of a current between the charging terminal and the transformerless power supply when the charging terminal cover is detached from the charger body. Accordingly, when the charging terminal cover is detached, the charging terminal is not energized, and therefore, it is possible to clean the charging terminal safely. When the charging terminal cover is attached, the charging terminal is covered with the charging terminal cover, and therefore, it is possible to prevent a human body from receiving an electric shock.

DESCRIPTION OF THE PREFERRD EMBODIMENTS

[Embodiment 1]

Embodiment 1 of the present invention is explained below with reference to each of the attached drawings.

Figure 1:
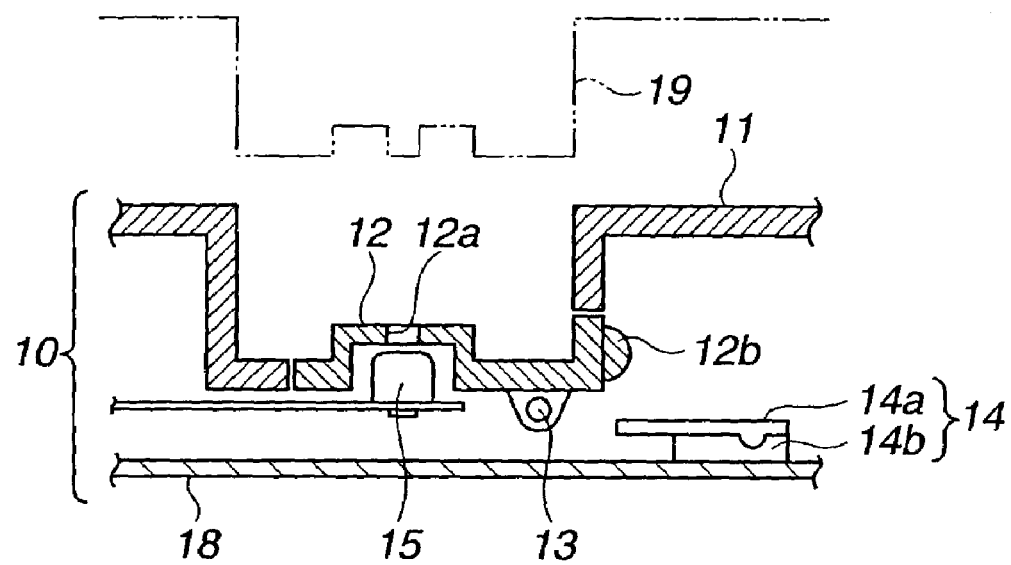
FIG. 1 is a block diagram of the transformerless charger according to Embodiment 1.

FIG. 1 is a block diagram of a transformerless charger 10 according to Embodiment 1, which shows its cover flipping mechanism shown as the main part in the drawing. Referring to FIG. 1, a reference numeral 15 is a charging terminal for charging a secondary battery placed in the rechargeable electronic equipment 19, a reference numeral 12 is a flip cover for covering the charging terminal 15 to prevent the charging terminal 15 from being exposed at the surface of the charger, and a reference numeral 14 is a switch that allows or blocks the passage for a current between the charging terminal 15 and a transformerless power supply circuit 16 (see FIG. 3) in synchronization with an opening or closing motion of the flip cover 12.

A charger body 11 and the flip cover 12 constitute a mounting table for mounting the rechargeable electronic equipment 19. The flip cover 12 has a port 12a that is open for connecting the rechargeable electronic equipment 19 with the charging terminal 15. As shown in FIG. 1, when the rechargeable electronic equipment 19 is mounted on the flip cover 12 in a closed state, a current passes between the rechargeable electronic equipment 19 and the flip cover 12 via the port 12, and the charging process is conducted. When the flip cover 12 is closed, the charging terminal 15 is not exposed, which is effective for preventing a human body from receiving an electric shock.

Figure 3:
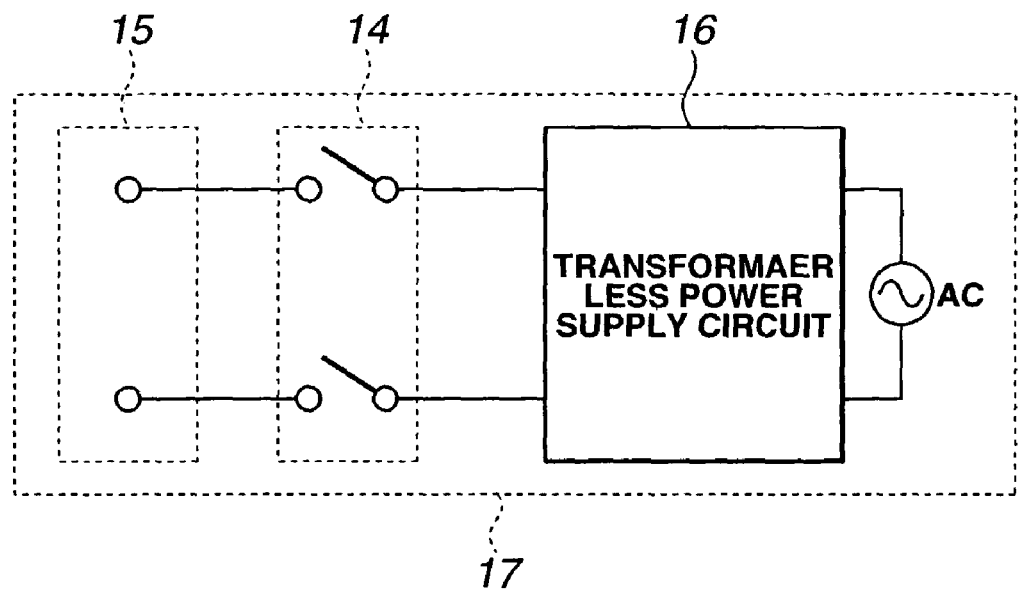
FIG. 3 is a schematic circuit diagram of the charging circuit according to Embodiment 1.

FIG. 3 is a schematic circuit diagram of a charging circuit 17 in the transformerless charger 10. As shown in FIG. 3, the charging circuit 17 comprises: the transformerless power supply circuit 16 for converting alternating power supply AC into DC voltage by means of, for example, rectification or smoothing; the charging terminal 15 for supplying charging voltage to the rechargeable electronic equipment 19; and the switch 14 for allowing or blocking the passage of a current between the transformerless power supply circuit 16 and the charging terminal 15.

As shown in FIG. 1, the switch 14 is attached on a circuit board 18 of the transformerless charger 10. The switch 14 comprises a switch body 14b that is fixed to the circuit board 18, and a switch board 14a that is constructed to be able to tilt towards the switch body 14b. The switch board 14a is urged almost vertically upward by an urging member such as a spring, and the passage or blocking of a current between the charging terminal 15 and the transformerless power supply circuit 16 is conducted in accordance with the tilted state of the switch board 14a. In other words, when the switch board 14a is tilted downward, the passage of a current is blocked between the charging terminal 15 and the transformerless power supply circuit 16, and when the switch board 14a is tilted upward, the passage of a current is allowed between the charging terminal 15 and the transformerless power supply circuit 16.

Figure 2:
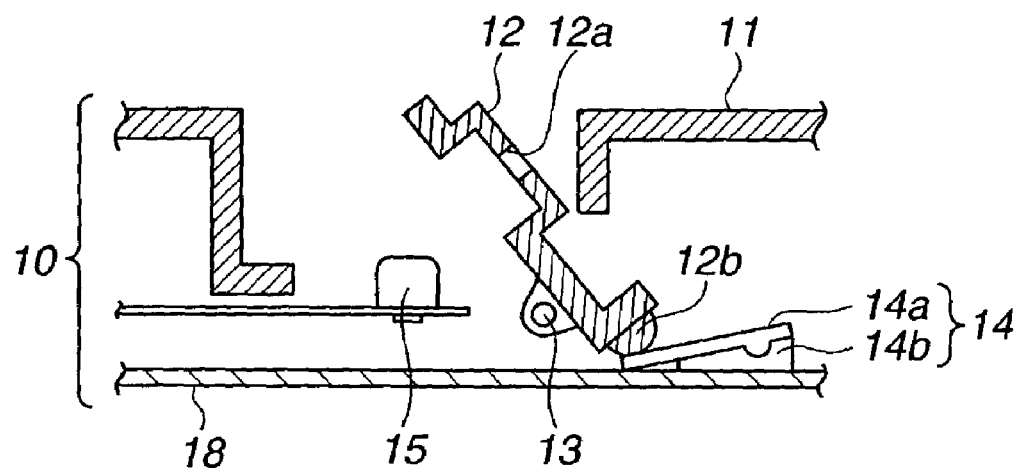
FIG. 2 is a block diagram of the transformerless charger according to Embodiment 1.

The flip cover 12 is attached to the charger body 11 via a hinge mechanism 13 and is constructed to be capable of freely opening or closing. As shown in FIG. 1, since no force is applied to push down the switch board 14a when the flip cover 12 is closed, the switch board 14a is tilted upward and the switch 14 is in a "closed state." In this state, charging voltage is continuously supplied to the charging terminal 15 and the charger is in a state capable of charging. On the other hand, as shown in FIG. 2, when the flip cover 12 turns on the hinge point of the hinge mechanism 13 and an pressing part 12b located on a rocking end of the flip cover 12 depresses the switch board 14a by resisting the urging force of the switch board 14a, the switch board 14a becomes is downward, and the switch 14 enters an "open state," which blocks the supply of charging voltage to the charging terminal 15. In this state, a human body will never receive an electric shock by touching the charging terminal 15. It is preferable that a sufficient turning range of the flip cover 12 is provided in order to enable easy cleaning of the charging terminal 15 when the flip cover 12 is opened.

As explained above, according to Embodiment 1, when the flip cover 12 is opened, the passage of current to the charging terminal 15 is blocked, and therefore, it is possible for a person to clean xogenous materials attached to the charging terminal 15 safely without receiving an electric shock. Accordingly, it is possible to extend the expected product life of the transformerless charger 10, and to improve its charging efficiency and product reliability. Moreover, by allowing the passage of a current to the charging terminal 15 with the flip cover 12 in the closed state, it is possible to prevent a human body from receiving an electric shock from the exposed charging terminal 15. Accordingly, it is possible to make the transformerless charger 10 compliant with the UL standards.

Moreover, even if the flipping function of the flip cover 12 is damaged, the charging function cannot be damaged with the flip cover 12 being closed, and the transformerless charger 10 can still meet the safety guidelines of the UL standards. Furthermore, not using a transformer makes it possible to broaden the scope of product design, and more advanced designs of the transformerless charger become possible. The transformerless product can also achieve cost and weight reduction.

When Embodiment 1 is applied to a cordless phone, the transformerless charger 10 corresponds to a base phone, and the rechargeable electronic equipment 19 corresponds to a cordless handset.

[Embodiment 2]

Preferred Embodiment 2 of the present invention is explained below with reference to FIG. 4.

Figure 4:
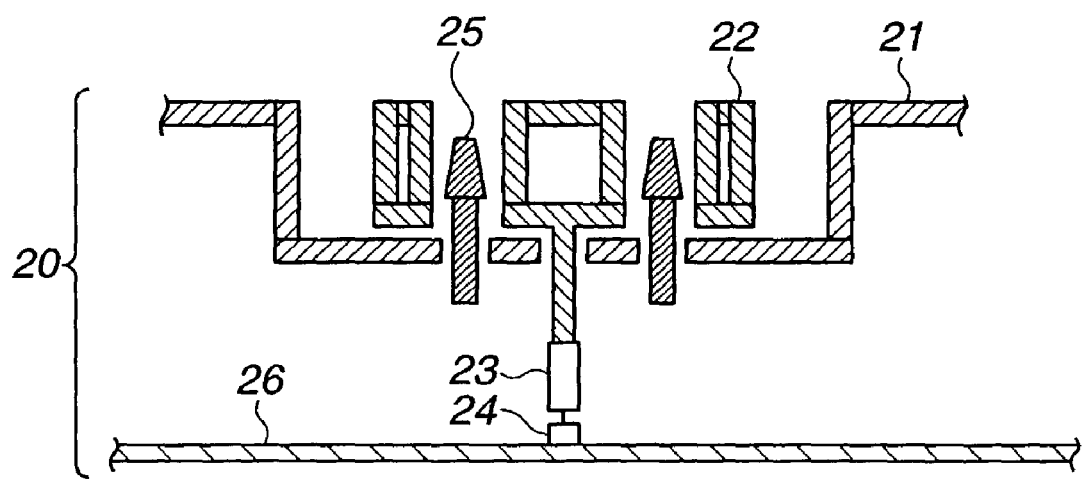
FIG. 4 is a block diagram of the transformerless charger according to Embodiment 2.

FIG. 4 is a block diagram of a transformerless charger 20, which shows an attaching and detaching mechanism of a charging terminal cover 22 as the main part in the drawing. In FIG. 4, a reference numeral 21 is a charger body, a reference numeral 25 is a charging terminal for charging rechargeable electronic equipment, and a reference numeral 22 is a charging terminal cover for covering an area around the charging terminal 25 to prevent the charging terminal 25 from being exposed. The charging terminal cover 22 is attachable to and detachable from the charger body 21. As shown in FIG. 4, when the charging terminal cover 22 is attached to the charger body 21, charging voltage is supplied to the charging terminal 25 from the transformerless power supply circuit, and the transformerless charger 20 is in a state capable of charging the rechargeable electronic equipment. Moreover, in this state, since the area around the charging terminal 25 is covered with the charging terminal cover 22, the charging terminal 25 is not exposed at the surface of the charger 20, which makes the charger 20 compliant with the safety guidelines of the UL standards.

On the other hand, when the charging terminal cover 22 is detached from the charger body 21, connection between a jack 24 mounted on a circuit board 26 and a short pin 23 provided on the charging terminal cover 22 is released, and the passage of a current to the charging terminal 25 is blocked. Accordingly, it is possible to easily clean the charging terminal 25 that is exposed at the surface. The circuit structure of a charging circuit including the charging terminal 25 is similar to that shown in FIG. 3, and the jack 24 and the short pin 23 achieve the function similar to that of the aforementioned switch 14.

According to Embodiment 2, it is possible to safely clean the charging terminal 25 to which the passage of a current to the charging terminal 25 is blocked by removing the charging terminal cover 22. Therefore, the expected product life of the transformerless charger 20 can be prolonged.

Moreover, when the charging terminal cover 22 is attached to the charger body 21, direct contact between the charging terminal 25 and a human body can be avoided. Therefore, it is possible to meet the UL standards.

[Embodiment 3]

Preferred Embodiment 3 of the present invention is explained below with reference to FIG. 5.

Figure 5:
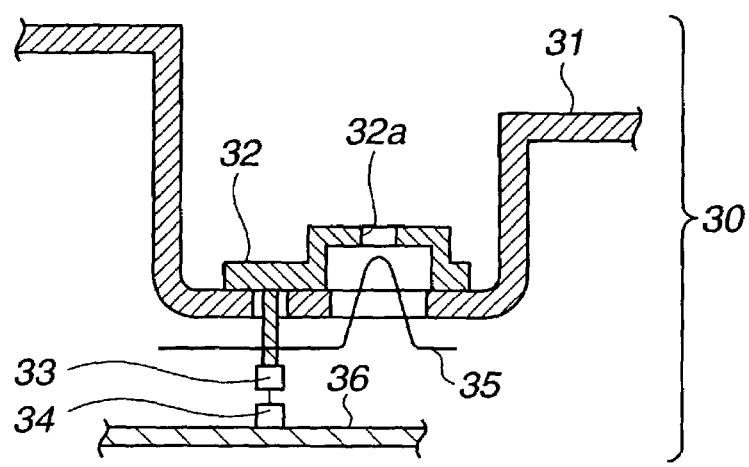
FIG. 5 is a block diagram of the transformerless charger according to Embodiment 3.

FIG. 5 is a block diagram of a transformerless charger 30, which shows an attaching and detaching mechanism of a charging terminal cover 32 as the main part in the drawing. In FIG. 5, a reference number 31 is a charger body, a reference number 35 is a charging terminal for charging the rechargeable electronic equipment, and a reference number 32 is the charging terminal cover for covering an area around the charging terminal 35 to prevent the charging terminal 35 from being exposed. The charging terminal cover 32 is attachable to and detachable from the charger body 31. When the charging terminal cover 32 is attached to the charger body 31, the charging terminal 35 is energized, and the rechargeable electronic equipment is charged via a port 32a that is situated in the charging terminal cover 32. On the other hand, when the charging terminal cover 32 is detached from the charger body 31, a connection between a jack 34 mounted on a circuit board 36 and a short pin 33 mounted on the charging terminal cover 32 is released, and the passage of a current to the charging terminal 35 is blocked. The circuit structure of a charging circuit including the charging terminal 35 is similar to that shown in FIG. 3, and the jack 34 and the short pin 33 achieve the function similar to that of the switch 14.

According to Embodiment 3, it is possible to safely clean the charging terminal 35 to which the passage of a current to the charging terminal 35 is blocked by removing the charging terminal cover 32. Therefore, the expected product life of the transformerless charger 30 can be prolonged. Moreover, when the charging terminal cover 32 is attached to the charger body 31, direct contact between the charging terminal 35 and a human body can be avoided. Therefore, it is possible to meet the UL standards.

[Embodiment 4]

Preferred Embodiment 4 of the present invention is explained below with reference to FIG. 6.

Figure 6:
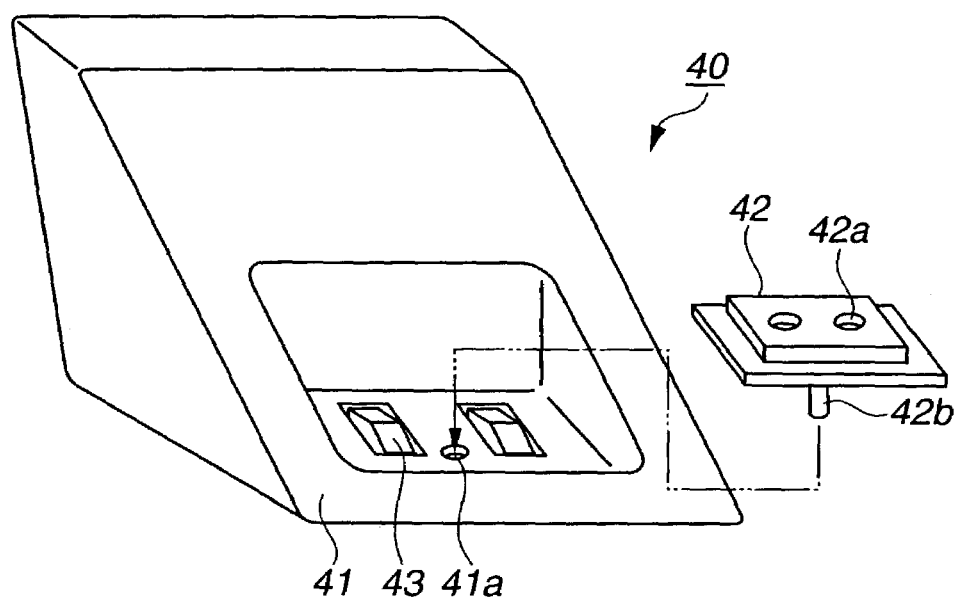
FIG. 6 is a block diagram of the transformerless charger according to Embodiment 4.

FIG. 6 is a block diagram of a transformerless charger 40, which shows an attaching and detaching mechanism of a charging terminal cover 42 as the main part in the drawing. In FIG. 6, a reference numeral 41 is a charger body, a reference numeral 43 is a charging terminal for charging the rechargeable electronic equipment, and a reference numeral 42 is the charging terminal cover for covering an area around the charging terminal 43 to prevent the charging terminal 43 from being exposed. The charging terminal cover 42 is attachable to and detachable from the charger body 41. The charging terminal cover 42 can be positioned at a predetermined position on the charger body 41 by inserting a pin 42b into a jack 41a. When the charging terminal cover 42 is attached to the charger body 41, the charging terminal 43 is energized, and the rechargeable electronic equipment is charged via a port 42a that is situated in the charging terminal cover 42. On the other hand, when the charging terminal cover 42 is detached from the charger body 41, the passage of a current to the charging terminal 43 is blocked. A mechanism of allowing or blocking the passage of a current to the charging terminal 43 can be achieved by the jack and the short pin as in Embodiment 2 or 3 described above.

According to Embodiment 4, it is possible to safely clean the charging terminal 43 to which the passage of a current to the charging terminal 43 is blocked by removing the charging terminal cover 42. Therefore, the expected product life of the transformerless charger 40 can be prolonged. Moreover, when the charging terminal cover 42 is attached to the charger body 41, direct contact between the charging terminal 43 and a human body can be avoided. Therefore, it is possible to meet the UL standards.

What is claimed is:

1. A transformerless charger comprising:
   a charging terminal for supplying charging voltage to rechargeable electronic equipment;
   a transformerless power supply circuit for supplying charging voltage to the charging terminal;
   a flip cover that covers the charging terminal to prevent the charging terminal from being exposed; and
   a switch that allows or blocks the passage of a current between the charging terminal and the transformerless power supply circuit in synchronization with an opening or closing motion of the flip cover;
   wherein the flip cover has a port through which the charging terminal is capable of connecting to the rechargeable electronic equipment, and the switch allows the charging terminal to charge the rechargeable electronic equipment when the flip cover is closed to cover the charging terminal to prevent the charging terminal from being exposed.

2. The transformerless charger according to claim 1, wherein the switch allows the passage of a current between the charging terminal and the transformerless power supply circuit when the flip cover is closed, and the switch blocks the passage of a current between the charging terminal and the transformerless power supply circuit when the flip cover is opened.

3. The transformerless charger according to claim 1, wherein the flip cover is attached to a charger body via a hinge mechanism.

4. A transformerless charger comprising:
   a charging terminal for supplying charging voltage to rechargeable electronic equipment;
   a transformerless power supply circuit for supplying charging voltage to the charging terminal;
   a charging terminal cover that is attachable to and detachable from the charger body so that the charging terminal is prevented from being exposed at the surface of the transformerless charger; and
   a switch that allows or blocks the passage of a current between the charging terminal and the transformerless power supply circuit in response to an attached or detached state of the charging terminal cover;
   wherein the charging terminal cover has a port through which the charging terminal is capable of connecting to the rechargeable electronic equipment, and the switch allows the charging terminal to charge the rechargeable electronic equipment when the charging terminal cover is attached to the charger body to prevent the charging terminal from being exposed.

5. The transformerless charger according to claim 4, wherein the switch allows the passage of a current between the charging terminal and the transformerless power supply when the charging terminal cover is attached to the charger body, and the switch blocks the passage of a current between the charging terminal and the transformerless power supply when the charging terminal cover is detached from the charger body.

* * * * *